United States Patent [19]

Minosou et al.

[11] Patent Number: 5,279,851
[45] Date of Patent: Jan. 18, 1994

[54] METHOD OF MANUFACTURING A CONDUCTIVE GLASS WITH HIGH STRENGTH AND WEAR RESISTANCE

[75] Inventors: Masao Minosou; Masakiyo Tonoike; Hideo Kawahara, all of Osaka, Japan

[73] Assignee: Nippon Sheet Glass Co., Ltd., Osaka, Japan

[21] Appl. No.: 856,747

[22] Filed: Mar. 24, 1992

[30] Foreign Application Priority Data

Apr. 3, 1991 [JP] Japan .................. 3-192657
Dec. 27, 1991 [JP] Japan .................. 3-346517

[51] Int. Cl.$^5$ .................. C23C 16/40; C23C 17/23; C23C 17/245
[52] U.S. Cl. .................. 427/126.2; 427/126.3; 427/255; 427/255.3; 427/255.7; 65/30.14; 65/60.5; 65/60.52
[58] Field of Search .................. 65/60.5, 60.52, 30.14; 427/126.3, 126.2, 255, 255.3

[56] References Cited

U.S. PATENT DOCUMENTS

| | | | |
|---|---|---|---|
| 3,647,531 | 3/1972 | Matsushita et al. | |
| 4,206,253 | 6/1980 | Watanabe. | |
| 4,842,630 | 6/1989 | Braithwaite et al. | 65/30.14 |
| 4,857,095 | 8/1989 | Brown | 65/60.3 |
| 5,090,985 | 2/1992 | Soubeyrand et al. | 65/60.52 |
| 5,156,885 | 10/1992 | Budd | 427/70 |

FOREIGN PATENT DOCUMENTS

| | | |
|---|---|---|
| 0074313 | 3/1983 | European Pat. Off. |
| 0357263 | 3/1990 | European Pat. Off. |
| 2310084 | 9/1973 | Fed. Rep. of Germany. |

OTHER PUBLICATIONS

Pulker, H. K., Coatings on Glass, Elsevier Publishers 1984 p. 441.
Chemical Abstracts, vol. 85, no. 4; abstract no. 24844j; & JP-A-51 041 717 (Apr. 1976).
Chemical Abstracts, vol. 85, no. 4; abstract no. 24845k; & JP-A-51 041 718 (Apr. 1976).
Chemical Abstracts, vol. 99, no. 8; abstract no. 57698g; PL-A-118 338 (Dec. 1982).

*Primary Examiner*—Shrive Beck
*Assistant Examiner*—Bret Chen
*Attorney, Agent, or Firm*—Kanesaka and Takeuchi

[57] ABSTRACT

A conductive glass with a coat constituted mainly of a potassium-contained stannic oxide applied on a glass substrate, wherein a film thickness of the coat constituted mainly of the stannic oxide comes within the range of 1 to 100 nm, a potassium concentration is 0.1 to 10.0 wt %, and a surface compression stress of the conductive glass is 30 to 100 kg/mm$^2$. After the stannic oxide coat is formed on the glass substrate, it is brought into contact with a melted potassium nitrate to contain potassium in the glass substrate and the coat.

8 Claims, 5 Drawing Sheets

METHOD OF MANUFACTURING A CONDUCTIVE GLASS WITH HIGH STRENGTH AND WEAR RESISTANCE

BACKGROUND OF THE INVENTION

1. Field of the Invention

The present invention relates to a conductive glass, and is particularly concerned with a conductive glass having a high strength and a high wear resistance.

2. Description of the Prior Art

Lately, a conductive glass is used in various fields such as electrodes for various displays or thin film photoelectric cells, transparent touch sensor, transparent anti-static coating, transparent electromagnetic shield and the like. The conductive glass is obtained exclusively by coating a glass substrate with a transparent conductive coating material thereon. For this kind of material, an oxide material having a semiconducting function is employed preferably, which includes representatively stannic oxide, indium tin oxide (hereinafter referred to as ITO), zinc oxide, cadmium tin oxide and others.

Since the conductive glass is exposed usually to a working surface, a high wear resistance and chemical resistance (acid and alkali resistances) are required sometimes for particular service. Further, for safety, there may be a case where a strength remarkably higher than a normal plate glass is required with the glass itself. To obtain a glass plate with high strength, such glass heated up to a softening point or over is cooled down quickly from the surface thereof to obtain a compression stress which is normally called thermal tempering, or glass plate is soaked in a molten salt containing potassium ion to exchange with a sodium ion in the glass, and thus the surface compression stress is obtained according to a difference in size of the ions, which is called chemical tempering. In either case, the glass is exposed to high temperature at about 400° C. to 600° C. in a process for increasing a strength of the glass.

However, it was difficult so far to satisfy concurrently an electrical characteristic of the conductive glass, a mechanical strength of the coat and a strength of a glass substrate. For example, an ITO film typical as the transparent conductive film displays a superior electrical characteristic, but is weak in wear resistance and chemical resistance of the film, and in addition a problem inherent therein is such that the electrical characteristic deteriorates or the film is damaged by carrying out the thermal tempering or chemical tempering for obtaining a strength of the conductive glass.

On the other hand, a stannic oxide film is superior to the ITO film in wear resistance. However, if a strength of the conductive glass is increased through the thermal tempering, then a sudden change in temperature of the process may often cause a crack on the film or a severe deformation of the glass substrate. Accordingly, for the thermal tempering, a strict temperature control will be necessary, or a deterioration of productivity may occur sometimes.

Further, it is conceivable that the glass substrate with thermal tempering and chemical tempering applied thereon beforehand is coated with a transparent conductive film, however, if a coating temperature is high in this case, the surface compression stress layer will vanish due to a transfer or diffusion of atoms.

Accordingly, a method available for coating at low temperature after the tempering is applied (for example, vacuum deposition and sputtering) is preferable as means for obtaining a conductive glass having a satisfactory strength, however, the equipment of this kind requires vacuum, so that a coating cost gets high inevitably.

SUMMARY OF THE INVENTION

In solving the aforementioned problems inherent in the prior art system, an object of the present invention is to provide a method for manufacturing conductive glass having a high strength and a high wear resistance.

The conductive glass according to the present invention is a conductive glass with a coat constituted mainly of stannic oxide containing potassium, formed on a glass substrate, which is characterized in that:

a thickness of the coat constituted mainly of stannic oxide is within the range of 1 to 100 nm, and a concentration of the potassium is 0.1 to 10.0 wt %;

a surface compression stress of the conductive glass is 20 to 100 kg/mm$^2$.

The manufacturing method for conductive glass of the present invention is characterized in that a coat constituted mainly of stannic oxide is formed on a glass substrate and is then brought into contact with molten potassium nitrate, thereby providing potassium in the glass substrate and the coat.

The glass substrate contains sodium. The glass substrate is preferably a float glass.

According to the present invention, a chemical tempering technique will be taken after forming the stannic oxide film with a proper thickness, thereby to improve a glass strength without deteriorating largely an electrical characteristic of the film. Further, a wear resistance will be also enhanced by potassium in the stannic oxide film.

DETAILED DESCRIPTION OF PREFERRED EMBODIMENTS

A composition of a preferable float glass employed in the method according to the present invention is as follows in percentage by weight:

| | |
|---|---|
| SiO$_2$: | 68 ~ 74 |
| Al$_2$O$_3$: | 0 ~ 3 |
| B$_2$O$_3$: | 0 ~ 5 |
| Na$_2$O: | 10 ~ 18 |
| K$_2$O: | 0 ~ 3 |
| Fe$_2$O$_3$: | 0 ~ 1 |
| CaO: | 6 ~ 14 |
| MgO: | 0 ~ 6 |

Means for forming a stannic oxide film includes vacuum deposition, sputtering, spraying, CVD process, dipping and various others, however, a so-called thermal decomposition such as spraying, CVD process or the like is advantageous of all from the viewpoint of productivity. In the thermal decomposition, a tin compound having a thermal decomposition property is a principal raw material, and concretely it is SnCl$_4$, (C$_n$H$_{2n+1}$)$_4$Sn (provided n=1 to 4), C$_4$H$_9$SnCl$_3$, (CH$_3$)$_2$SnCl$_2$, (C$_4$H$_9$)$_2$Sn(OCOCH$_3$)$_2$ and others are used. Further, in order to improve the electrical characteristic, fluorine is added often to the film, and HF, CCl$_2$F$_2$, CHClF$_2$, CH$_3$CHF$_2$, CF$_3$Br, CF$_3$COOH, NH$_4$F and others are known as the raw materials therefor. It is preferable that the film is formed through CVD process by bringing vapor of these raw materials into contact with a heated glass together with an oxidative gas such as oxygen or the like, or is formed by dissolving the raw materials in an organic solvent such as alcohol, benzene, toluene or the like and spraying onto the heated glass.

As for the film thickness of a coat constituted mainly of the stannic oxide filmed according to such process, the thicker, the better for decreasing an electric resistance, however, if it is too thick, then a transparency will be spoiled by optical absorption of the film, or an ion exchange in the chemical tempering process will become difficult. The film thickness is within the range of 1 to 100 nm practically or 5 to 50 nm preferably.

In the method of the present invention, a coat constituted mainly of stannic oxide is formed on the glass substrate, and then the filmed glass substrate is subjected to a chemical tempering. The chemical tempering is carried out by fusing a salt containing potassium such as potassium nitrate or the like and soaking glass therein for predetermined period of time.

An electric resistance value of the conductive glass thus obtained increases somewhat as compared with that before the chemical tempering, which does not cause so big trouble practically.

Figure 2:
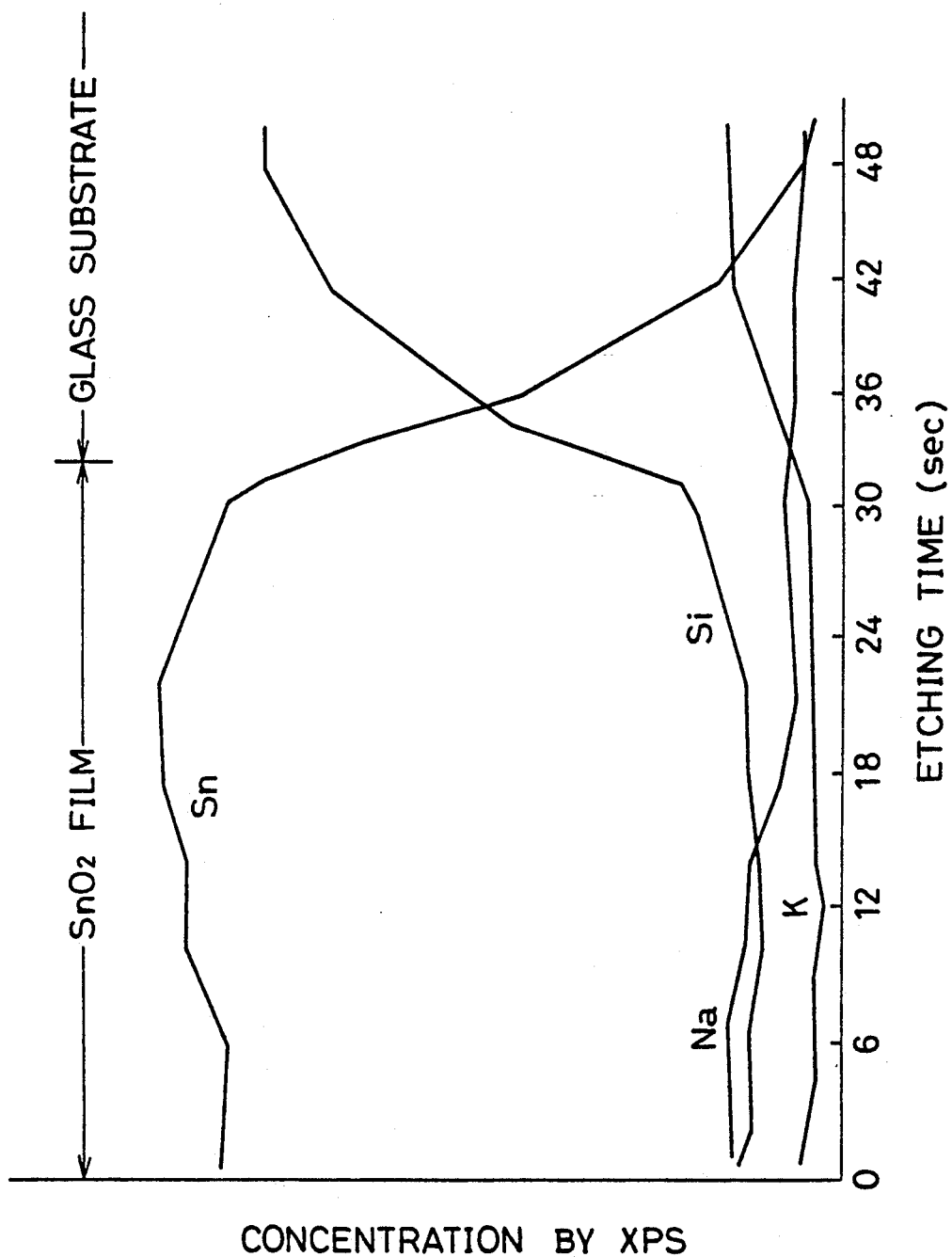
FIG. 2 is a profile in the direction of depth of Sn, Si, Na and K in the film and on the glass substrate surface after chemical tempering of the glass substrate with stannic oxide coated thereon in the embodiment 1 of the present invention.

By carrying out a measurement of change in the electric resistance value by means of a reciprocating slide tester for looking into a wear resistance performance of the film, it was found that the film with a chemical tempering applied thereon was higher in initial resistance value than that without a chemical tempering, and thus was higher in durability. The particular cause is not known, however, it is conceivable that potassium distributed almost uniformly in the stannic oxide film as shown in FIG. 2 has something to do therewith.

Figure 1:
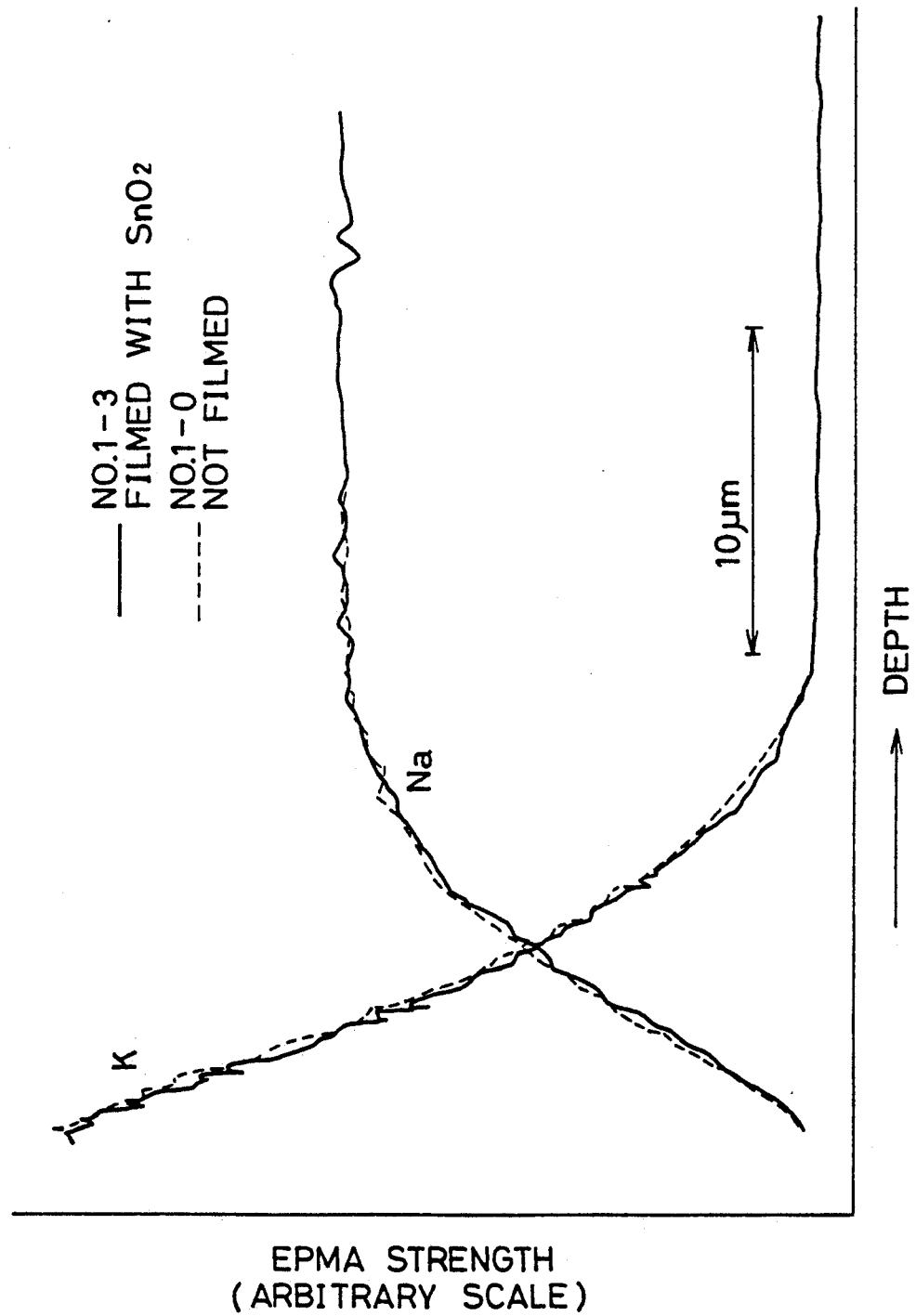
FIG. 1 is a profile in the direction of depth of Na and K ions after chemical tempering of a glass substrate with stannic oxide coated thereon in the embodiment 1 of the present invention.

Further, by evaluating a strength of the coated glass on a glass surface stress measuring apparatus using a photoelasticity process, it was found that a coated glass having a favorable strength when comparing a sample free from a film of the stannic oxide was obtainable. Then, by observing a concentration profile of potassium in the direction of depth on the coated glass surface with reference to a propriety of the chemical tempering, the same profile was obtained irrespective of presence of the film as shown in FIG. 1.

A concentration of potassium contained in the stannic oxide film by chemical tempering is specified at 0.1 to 10 wt %. If the potassium concentration is lower than 0.1 wt %, an effect in enhancing the wear to resistance will be decreased. Then, when exceeding 10 wt %, an evil influence such as increasing electric resistance of the film or the like will occur.

The value of a surface compression stress of the coated glass after chemical tempering is specified at 20 to 100 kg/mm$^2$. If the surface compression stress value exceeds 100 kg/mm$^2$, then it comes near to a breaking stress value (about 200 to 300 kg/mm$^2$) and becomes unstable, which is capable of causing a self-breakdown and hence is not preferable. On the other hand, if the surface compression stress value is less than 20 kg/mm$^2$, it does not increase a strength of the conductive glass as a matter of fact, moreover the difference relative to a surface compression stress of the unfilmed surface (subjected normally to a chemical tempering) becomes large to cause an evil influence such as warp or the like.

As described above, spraying or CVD process is preferable as a forming method of the coat constituted mainly of stannic oxide, however, the following problems are inherent in a prior art of forming stannic oxide according to the spray process. That is, a tin compound containing chlorine such as SnCl$_4$, (CH$_3$)$_2$SnCl$_2$ or the like is high in forming corrosion of raw material and its decomposition product, and hence a corrosion resisting material must be used for a driving device, exhausting device and other peripheral equipment with which a gas comes in contact, which is not preferable in respect of cost. Meanwhile, dibutyltin laurate (C$_4$H$_9$)$_2$Sn(CH$_3$(CH$_2$)$_{10}$COO)$_2$ and dibutyltin maleate (C$_4$H$_9$)$_2$Sn(CHCOO)$_2$ comparatively low in toxicity and easy to use may be taken up as nonchloric materials, however, a specific resistance of the stannic oxide film obtained therethrough is high and characteristics are inferior as a transparent conductor. Further, dibutyltin diacetate (C$_4$H$_9$)$_2$Sn(OCOCH$_3$)$_2$ regarded superior in electrical characteristics of the obtained film is high in toxicity and hence is not practical.

Thus, a practical raw material capable of obtaining a quality coat low in toxicity as a raw material for spray process, free from a corrosive gas to be generated at the time of coating and low in specific resistance after coating has not been proposed so far.

Now, therefore, in the present invention, it is preferable that for forming a thin film consisting mainly of a stannic oxide film on a substrate through a thermal decomposition, dioctyltin diacetate (C$_8$H$_{17}$)$_2$Sn(OCOCH$_3$)$_2$ and a raw material in which a fluorine-containing compound is contained at 0.1 to 10 in a value (atomic ratio) of (fluorine in liquid)/(tin) or trifluoroacetic acid (CF$_3$COOH) preferably are employed as raw materials, and are sprayed onto a high-temperature glass substrate, and thus a transparent conductive film is formed through a thermal decomposition in the vicinity of a glass substrate surface.

According to the particular method, a quality film low in toxicity of a raw material, free from a corrosive gas generated at the time of filming and low in specific resistance after forming the stannic oxides film is obtainable by using dioctyltin diacetate (C$_8$H$_{17}$)$_2$Sn(OCOCH$_3$)$_2$ as raw material for spray process.

As compared with dibutyltin diacetate, the raw material has not only large carbon number of the alkyl group and is low in an oral toxicity itself but also low vapor pressure and less capability of inhalation. Further, what is advantageous is that the raw material is dissolved easily in many kinds of solvent such as alcohols of ethyl alcohol, n-propyl alcohol, i-propyl alcohol, butyl alcohol and others, aromatics such as toluene, benzene, xylene and others, and ketones such as diethyl ketone, methyl ethyl ketone and others.

A stannic oxide film is obtained from atomizing dioctyltin diacetate dissolved in such solvents in a predetermined amount through a spray nozzle, and spraying it onto a glass substrate heated to 400° to 700° C. beforehand. The concentration may be set according to a relation between a spray amount per unit time and a deposition rate per unit time, however, 1 vol % to 50 vol % will be proper practically.

For improving an electrical characteristic of stannic oxide, normally a fluorine raw material and an antimony raw material are mixed properly in a raw material mixed solution, however, fluorine may provide a better result in thermal decomposition. In this case, ammonium fluoride ($NH_4F$) and trifluoroacetic acid ($CF_3COOH$) are well known, however, if these must be dissolved in a predetermined solvent as mentioned above, trifluoroacetic acid dissoluble in more kinds of solvents is more advantageous. An amount to be dissolved will be appropriate at 0.1 to 10 in a value (atomic ratio) in the raw material solution of (fluorine)/(tin) in the case of tin compound. If the value (atomic ratio) in the raw material solution of (fluorine)/(tin) is less than 0.1, then the electrical characteristic deteriorates, and if greater than 10, an unexpected effect comes out as not only the electrical characteristic is saturated but also, for example, an abrasion resistance of the film deteriorates.

As another process, dioctyltin diacetate is atomized with ultrasonic waves as an energy source, and brought into contact with glass heated beforehand, thereby obtaining a stannic oxide coat. In this case, an organic solvent may not be necessary.

The present invention will now be described more concretely with reference to operative examples given hereunder, however, the present invention is not necessarily limited to the operative examples unless otherwise changing the gist.

EXAMPLE 1

A thoroughly washed 100 mm square float plate glass (5 mm thick) (visible light transmittance being 88.1%) was prepared and intended for a substrate. A composition (wt %) of the float glass is as follows. A stannic oxide film was formed thereon through the following process.

$SiO_2$: 71.1   $Al_2O_3$: 1.5   $B_2O_3$: 0   CaO: 8.9   MgO: 3.9

$K_2O$: 0.9   $Na_2O$: 13.3   $Fe_2O_3$: 0.1

The stannic oxide film was formed according to CVD process by means of a mixed gas consisting of monobutyl tin trichloride and steam, oxygen gas, 1,1-difluoroethane gas and nitrogen gas. A heating temperature of the glass substrate was 540° C. A flow rate of tin raw materials was changed properly, thereby obtaining three kinds of films different in film thickness. An electric resistance value (resistance between two terminals spaced out 1 cm apart) of the conductive glass and visible light transmittance are as given in TABLE 1.

TABLE 1

| No. | $SnO_2$ film thickness (nm) | Before chemical tempering Resistance (Ω) | Before chemical tempering Visible light transmittance (%) | After chemical tempering Resistance (Ω) | After chemical tempering Visible light transmittance (%) | Glass surface compression stress (kg/mm²) | Remarks |
|---|---|---|---|---|---|---|---|
| 1-0 | None | — | 88.1 | — | 88.3 | 44.5 | Comparative example |
| 1-1 | 8.5 | $2.06 \times 10^6$ | 87.9 | $1.60 \times 10^7$ | 87.7 | 44.5 | Operative example |
| 1-2 | 10.0 | $2.80 \times 10^5$ | 86.8 | $2.30 \times 10^6$ | 86.8 | 44.7 | Operative example |
| 1-3 | 20.0 | $1.90 \times 10^4$ | 84.0 | $1.00 \times 10^5$ | 84.1 | 44.5 | Operative example |

Next, the three kinds of coated glass substrates were soaked in a melted potassium nitrate (470° C.) for 4.5 hours, drawn up then and cooled down slowly. For comparison a float plate glass substrate (5 mm thick) free from a stannic oxide film was soaked at the same time. Washed in water thereafter, and an electric resistance value and a visible light transmittance were measured. The result is shown in TABLE 1.

Figure 3:
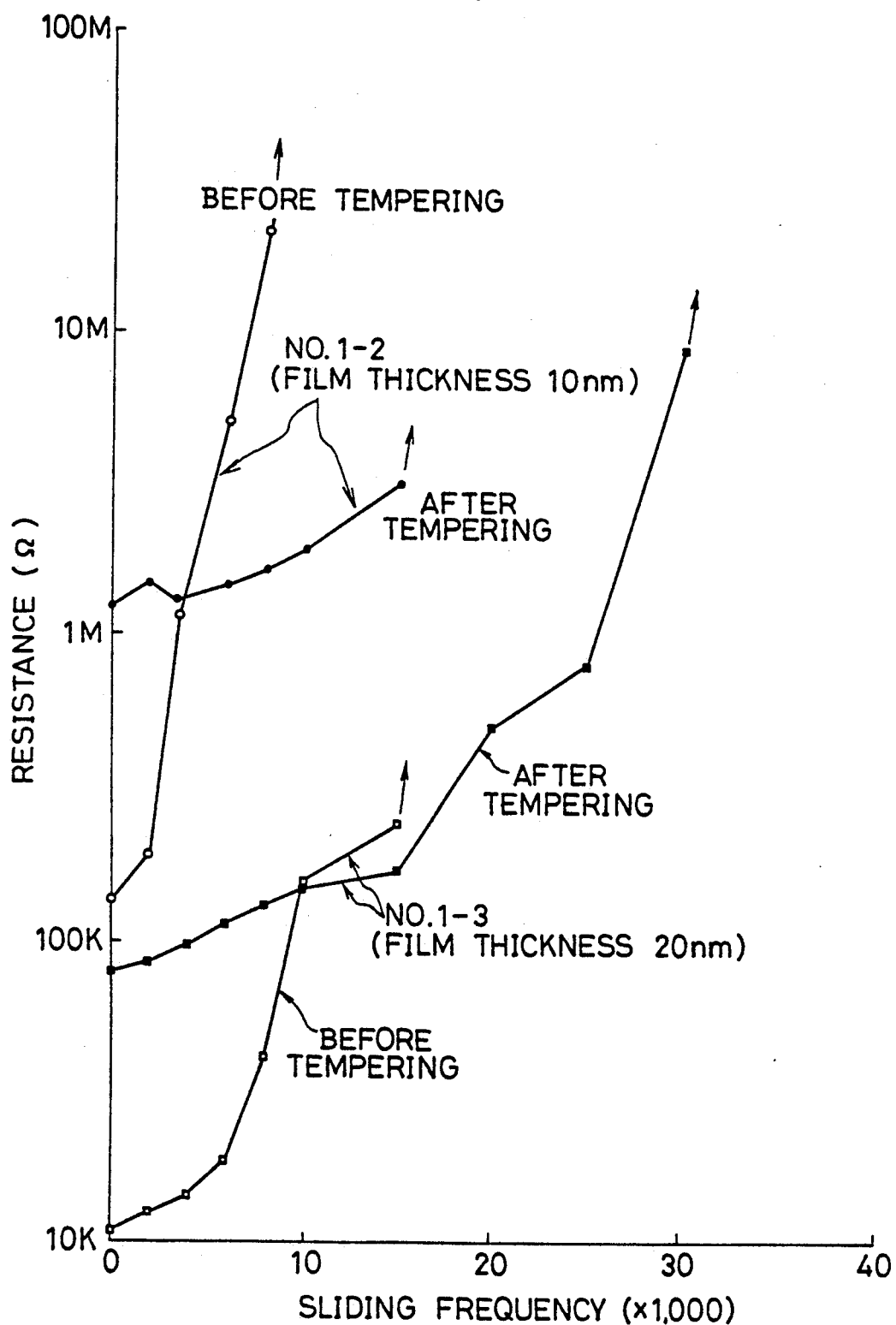
FIG. 3 is a wear resisting performance test result of a conductive glass before and after chemical tempering of the glass substrate with a stannic oxide coated thereon in the embodiment 1 of the present invention.

Small pieces 50×70 mm were cut out of those obtained each before and after chemical tempering for sample Nos. 1-2 and 1-3, and for examining a wear resisting performance of the stannic oxide film, a change of the electric resistance value was measured by means of a reciprocating slide tester. The result is shown in FIG. 3.

Next a small piece 30 mm square was cut out of each sample, and a surface compression stress of each glass sample subjected to the above tempering process was measured by a glass surface stress measuring apparatus made by Toshiba Glass Co., Ltd. The result is shown in TABLE 1 likewise.

In order to ensure whether or not an ion exchange was effected, a concentration profile in the direction of depth of a potassium ion and a sodium ion was observed from the glass substrate surface by means of EPMA (Electron Probe X-ray Microanalyzer) for the sample Nos. 1-0 and 1-3. The result is shown in FIG. 1.

From FIG. 1, it is apparent that a similar profile is obtainable irrespective of a presence of the film.

Further, to grasp an influence of the chemical tempering on the stannic oxide film, a concentration profile in the direction of each atom of Sn, K, Na, Si was observed by XPS (X-ray photoelectron spectroscopy), and the result is as shown in FIG. 2.

From FIG. 2, it is apparent that potassium is distributed almost uniformly in the stannic oxide film and the glass substrate.

EXAMPLE 2

A thoroughly washed 100 mm square float plate glass (5 mm thick) (visible light transmittance being 89.5%) was prepared and intended for a substrate. A stannic oxide film was formed thereon through the following process.

Dibutyltin diacetate and trifluoroacetic acid, isopropanol are mixed in the following ratio, and the liquid is sprayed on glass heated to 600° C. to obtain a stannic oxide film.

| Dibutyltin diacetate | 10.0 g |
|---|---|
| Trifluoroacetic acid | 1.6 g |
| Isopropanol | 200 cc |

The spray was changed to obtain three kinds of films different in film thickness. An electric resistance value (resistance between two terminals spaced out 1 cm apart) of the conductive glass and a visible light transmittance are as mentioned in TABLE 2.

TABLE 2

| No. | $SnO_2$ film thickness (nm) | Before chemical tempering | | After chemical tempering | | Glass surface compression stress (kg/mm$^2$) | Remarks |
|---|---|---|---|---|---|---|---|
| | | Resistance (Ω) | Visible light transmittance (%) | Resistance (Ω) | Visible light transmittance (%) | | |
| 2-0 | None | — | 89.5 | — | 89.5 | 54.9 | Comparative example |
| 2-1 | 5.0 | $1.03 \times 10^7$ | 88.8 | $5.05 \times 10^7$ | 88.3 | 50.5 | Operative example |
| 2-2 | 9.0 | $9.07 \times 10^5$ | 84.8 | $4.55 \times 10^6$ | 87.6 | 48.4 | Operative example |
| 2-3 | 15.0 | $6.80 \times 10^4$ | 84.8 | $1.95 \times 10^5$ | 84.7 | 44.5 | Operative example |

Next the three kinds of coated glass substrates were soaked in molten potassium nitrate (470° C.) for 4.5 hours, drawn up then and cooled down slowly. For comparison a float plate glass substrate (5 mm thick) free from a stannic oxide film was soaked at the same time. Washed in water thereafter, and an electric resistance value and a visible light transmittance were measured. The result is shown in TABLE 2.

Next a small piece 30 mm square was cut out of each sample, and a surface compression stress of each glass sample subjected to the above tempering process was measured by a glass surface stress measuring apparatus made by Toshiba Glass Co., Ltd. The result is given in TABLE 2 likewise.

A small piece 50×70 mm was cut out of the remaining samples, and for examining a wear resisting performance of the stannic oxide film, a change of the electric resistance value was measured by means of a reciprocating slide tester. The result was same as that of example 1.

From the above results, it was found that glass was subjected to an ion exchange through a film by carrying out a chemical tempering process in the stannic oxide film, and thus the glass high in strength was obtainable, a wear resisting performance of the film was increased remarkably at the same time.

EXAMPLE 3

A thoroughly washed 100 mm square float plate glass (3 mm thick) was prepared and intended for a substrate. A stannic oxide film was formed under the following process.

Dioctyltin diacetate (DOTA) was used as a tin raw material, a raw material liquid was prepared by mixing the tin raw material with trifluoroacetic acid and isopropanol in the following ratio, and the liquid was sprayed on a glass substrate heated to 600° C. to obtain a stannic oxide film.

| (Raw material liquid) | |
|---|---|
| Dioctyltin diacetate | 67 g (about 0.14 mols/liter) |
| Trifluoroacetic acid | 8.3 g |
| Isopropanol | 1 liter |

A correlation between a sheet resistance and a visible light transmittance of four kinds of stannic oxide films different in thickness which were obtained as a result of having controlled a spray time properly is shown in TABLE 3.

For comparison, stannic oxide films different in thickness were formed by controlling properly a spray time in the same way as above except that dibutyltin maleate (DBTM) was used as a tin raw material, a raw material liquid was prepared by mixing the tin raw material with trifluoroacetic acid and isopropanol in the following ratio, and the liquid was sprayed on the glass substrate heated to 600° C. to obtain a stannic oxide film; and a correlation between a sheet resistance and a transmissivity is shown in TABLE 3.

| (Raw material liquid) | |
|---|---|
| Dibutyltin maleate | 50 g (about 0.14 mols/liter) |
| Trifluoroacetic acid | 8.3 g |
| Isopropanol | 1 liter |

TABLE 3

| No. | Tin raw material | Film thickness (A) | Visible light transmittance (%) | Resistance (Ω) | Specific resistance (Ω cm) |
|---|---|---|---|---|---|
| 3-1 | DOTA | 230 | 87.8 | $1.8 \times 10^5$ | 0.42 |
| 3-2 | DOTA | 250 | 87.4 | $2.9 \times 10^5$ | 0.73 |
| 3-3 | DOTA | 320 | 86.1 | $3.0 \times 10^4$ | 0.10 |
| 3-4 | DOTA | 330 | 86.0 | $2.4 \times 10^4$ | 0.08 |
| 3-5 | DBTM | 150 | 89.4 | $1.4 \times 10^7$ | 21 |
| 3-6 | DBTM | 160 | 89.2 | $4.0 \times 10^6$ | 6.4 |
| 3-7 | DBTM | 360 | 85.9 | $3.2 \times 10^5$ | 1.2 |
| 3-8 | DBTM | 420 | 85.1 | $3.2 \times 10^5$ | 1.3 |

EXAMPLE 4

Next an examination was made on how a value (atomic ratio) of (fluorine)/(tin) in the raw material liquid was influential on a sheet resistance of the stannic oxide film. A glass substrate was prepared as in the case of example 3. A raw material liquid was prepared by mixing DOTA, trifluoroacetic acid and isopropanol in a value (atomic ratio) of (fluorine)/(tin) in the raw material liquid as shown in TABLE 4, and the liquid was sprayed on the glass substrate heated to 600° C. to obtain a stannic oxide film. The film was made 250 angstrom thick by controlling spray amount and time and compared for resistance value. The result is shown in TABLE 4.

TABLE 4

| No. | F/Sn ratio in liquid | Resistance value (Ω) |
|---|---|---|
| 4-1 | 0 | $4.0 \times 10^7$ |
| 4-2 | 0.75 | $1.5 \times 10^6$ |
| 4-3 | 1.5 | $2.9 \times 10^5$ |
| 4-4 | 6 | $4.0 \times 10^4$ |
| 4-5 | 10 | $5.0 \times 10^4$ |
| 4-6 | 20 | $8.5 \times 10^4$ |

As will be apparent from TABLE 4, in the case of No. 4-1, the value (atomic ratio) of (fluorine)/(tin) in the raw material liquid is less than 0.1, an electrical characteristic is too unsatisfactory to stand against a practical service, and if the value is greater than 10 as in the case of No. 4-6, then only the electrical characteristic is saturated, and an effect is not so expectable from increasing the fluorine.

EXAMPLE 5

TABLE 5

| No. | SnO2 film thickness (nm) | Before chemical tempering Resistance (Ω) | Before chemical tempering Visible light transmittance (%) | After chemical tempering Resistance (Ω) | After chemical tempering Visible light transmittance (%) | Glass surface compression stress (kg/mm²) | Remarks |
|---|---|---|---|---|---|---|---|
| 5-0 | None | — | 90.1 | — | 90.1 | 56.7 | Comparative example |
| 5-1 | 16.0 | $1.2 \times 10^6$ | 87.6 | $9.0 \times 10^6$ | 87.7 | 54.5 | Operative example |
| 5-2 | 19.0 | $4.4 \times 10^5$ | 86.7 | $2.7 \times 10^6$ | 86.5 | 50.3 | Operative example |
| 5-3 | 23.0 | $3.1 \times 10^5$ | 86.4 | $1.6 \times 10^6$ | 85.9 | 52.5 | Operative example |
| 5-4 | 25.5 | $9.0 \times 10^4$ | 85.6 | $6.4 \times 10^5$ | 85.7 | 56.3 | Operative example |

A thoroughly washed 100 mm square float plate glass (3 mm thick) was prepared and intended for a substrate. A stannic oxide film was formed under the following process.

Dioctyltin diacetate (DOTA) was used as a tin raw material, a raw material liquid was prepared by mixing the tin raw material with trifluoroacetic acid and isopropanol in the following ratio, and the liquid was sprayed on a glass substrate heated to 600° C. to obtain a stannic oxide film.

| (Raw material liquid) | |
|---|---|
| Dioctyltin diacetate | 67 g (about 0.22 mols/liter) |
| Trifluoroacetic acid | 8.3 g |
| Isopropanol | 1 liter |

A correlation between a sheet resistance and a visible light transmittance of four kinds of stannic oxide films different in thickness which were obtained as a result of having controlled a spray time properly is shown in TABLE 5.

Next, the four kinds of coated glass substrates were soaked in molten potassium nitrate (470° C.) for 4.5 hours, drawn up then and cooled down slowly. For comparison a float plate glass substrate (3 mm thick) free from a stannic oxide film was soaked at the same time. Washed in water thereafter, and an electric resistance value and a visible light transmittance were measured. The result is shown in TABLE 5.

Next a small piece 30 mm square was cut out of each sample, and a surface compression stress of each glass sample subjected to the above tempering process was measured by a glass surface stress measuring apparatus made by Toshiba Glass Co., Ltd. The result is shown in TABLE 5 likewise.

Figure 4:
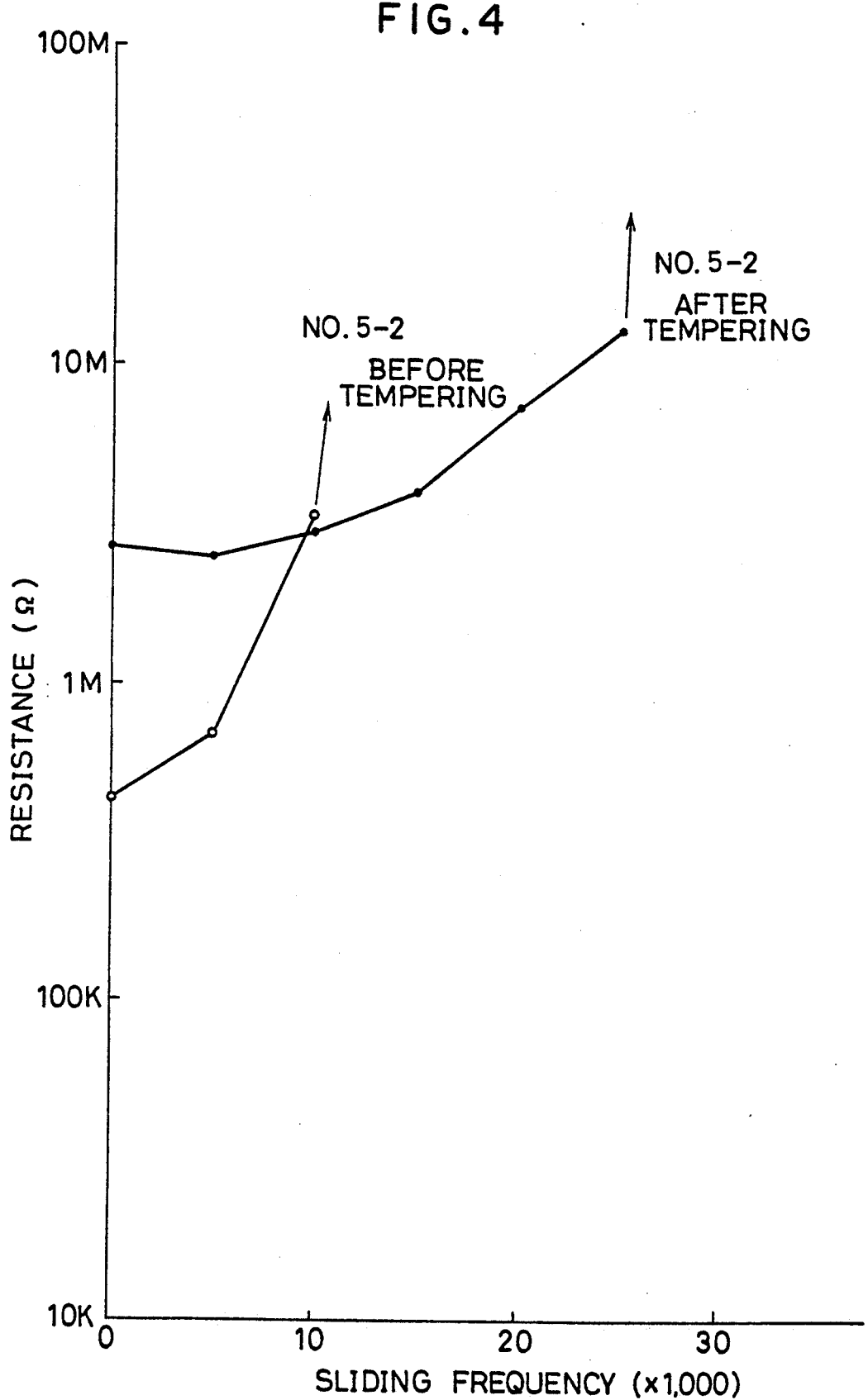
FIG. 4 is a wear resisting performance test result of a conductive glass before and after chemical tempering of the glass substrate with stannic oxide coated thereon in the embodiment 5 of the present invention.

Small pieces 50×70 mm were cut out of those obtained before and after chemical tempering for sample No. 5-2, and for examining a wear resisting performance of the stannic oxide film, a change of the electric resistance value was measured by means of a reciprocating slide tester. The result is shown in FIG. 4.

In order to ensure whether or not an ion exchange was effected, a concentration profile in the direction of depth of a potassium ion and a sodium ion was observed from the glass substrate surface by means of EPMA (Electron Probe X-ray Microanalyzer) for the sample No. 5-2. The result is the same as shown in FIG. 1, it is apparent that a similar profile is obtainable irrespective of a presence of the film.

Figure 5:
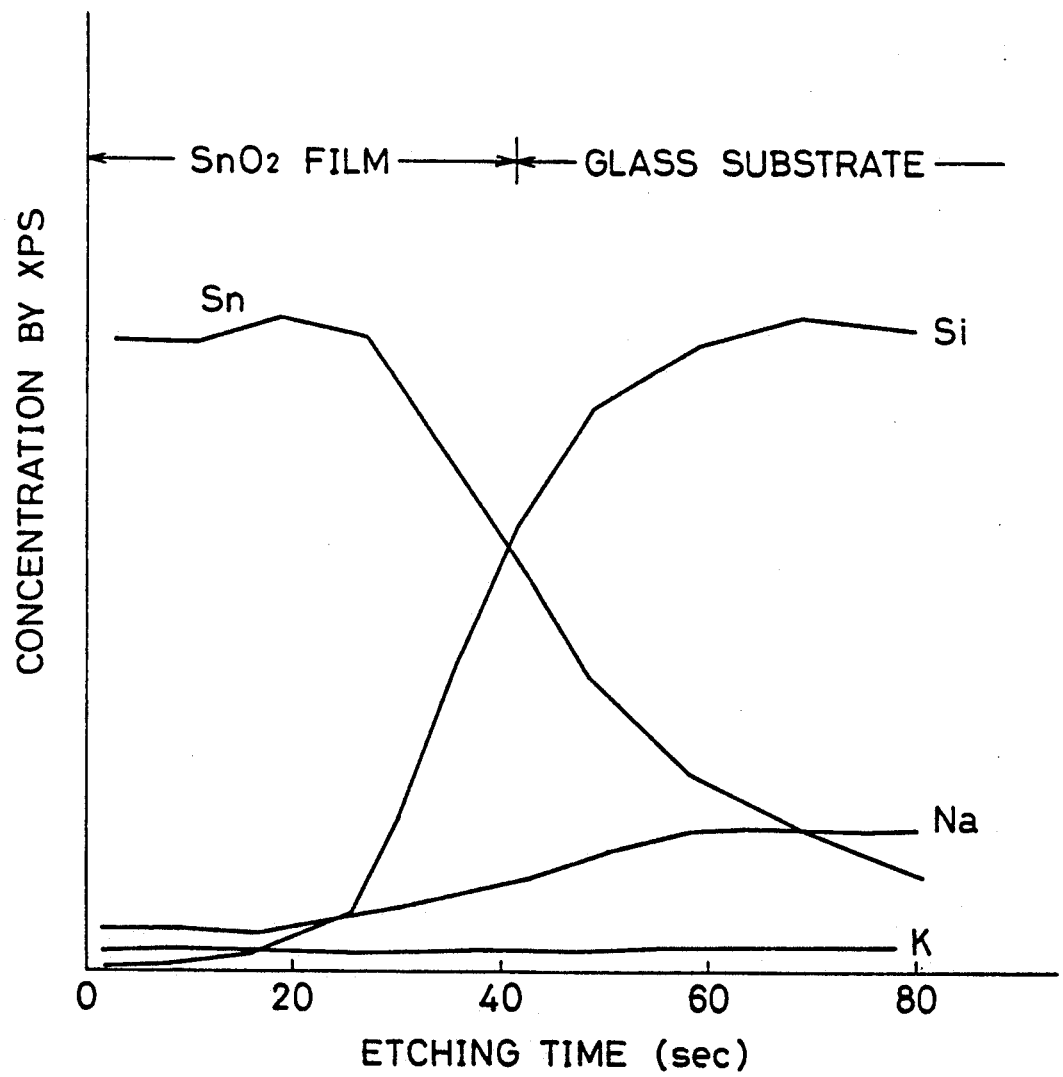
FIG. 5 is a profile in the direction of depth of Sn, Si, Na and K in the film and on the glass substrate surface after chemical tempering of the glass substrate with stannic oxide coated thereon in the embodiment 5 of the present invention.

Further, to grasp an influence of the chemical tempering on the stannic oxide film, a concentration profile in the direction of each atom of Sn, K, Na, Si was observed by XPS (X-ray photoelectron spectroscopy), and the result is as shown in FIG. 5.

From FIG. 5, it is apparent that potassium is distributed almost uniformly in the stannic oxide film and the glass substrate.

As will be apparent from the aforementioned examples, for forming a stannic oxide film through a thermal decomposition, a predetermined ratio of fluorine compound is added with a dioctyltin diacetate as starting raw material, thus since the dioctyltin diacetate does not contain a chlorine, the advantage is ensured such that members constructing a filming device are free from a corrosion due to the chlorine, and a film with better electrical characteristics is obtainable than in case a tin compound free from an analogous chlorine is used and safe to the human body.

What is claimed is:

1. A method for manufacturing a conductive glass, comprising,
    preparing a coating material to form a coat mainly containing stannic oxide,
    applying the coating material on a glass substrate to form the coat having a thickness within a range of 1 to 100 nm, and
    applying molten potassium nitrate onto the coat and the glass substrate so that potassium is contained in both the coat and the glass substrate to thereby provide wear resistance to the coat and strength to the glass substrate, potassium being contained in the coat at a concentration of 0.1 to 10.0 wt %, said glass substrate having a glass surface compression stress of 20 to 100 kg/nm².

2. The method for manufacturing a conductive glass as defined in claim 1, wherein the coat constituted mainly of the stannic oxide is formed by a thermal decomposition process.

3. The method for manufacturing a conductive glass as claimed in claim 1, wherein the glass substrate is subjected to ion exchange through the coat by the molten potassium nitrate.

4. The method for manufacturing a conductive glass as claimed in claim 1, wherein said coating material contains dioctyltin diacetate $(C_8H_{17})_2Sn(OCOCH_3)_2$ and a fluorine compound.

5. The method for manufacturing a conductive glass as defined in claim 4, wherein the fluorine compound is a trifluoroacetic acid.

6. The method for manufacturing a conductive glass as claimed in claim 4 wherein said coating material further includes a solvent.

7. The method for manufacturing a conductive glass as claimed in claim 6, wherein said glass substrate is heated, and said coating material is applied onto the heated glass substrate to cause thermal decomposition of the coating material near a surface of the glass substrate to thereby form the coat onto the glass substrate.

8. A method for manufacturing a conductive glass, comprising, preparing a coating material containing in a solvent dioctyltin diacetate $(C_8H_{17})_2Sn(OCOCH_3)_2$ and a fluorine compound so that atomic ratio of fluorine/tin is 0.1 to 10, heating a glass substrate between 400° and 700° C., and applying said coating material onto the heated glass substrate by spraying to cause thermal decomposition of the coating material near a surface of the glass substrate to thereby form a coat onto the glass substrate without causing corrosion.

* * * * *